United States Patent
Shannon et al.

(10) Patent No.: US 10,508,184 B2
(45) Date of Patent: Dec. 17, 2019

(54) FOAMING AGENT MASTERBATCHES FOR FOAMING THERMOPLASTIC VULCANIZATES

(71) Applicant: ExxonMobil Chemical Patents Inc., Baytown, TX (US)

(72) Inventors: Porter C. Shannon, Seabrook, TX (US); Charles L. Antonini, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 125 days.

(21) Appl. No.: 15/809,294

(22) Filed: Nov. 10, 2017

(65) Prior Publication Data

US 2018/0186961 A1    Jul. 5, 2018

Related U.S. Application Data (60) Provisional application No. 62/439,912, filed on Dec. 29, 2016.

(51) Int. Cl.
*C08J 3/22* (2006.01)
*C08J 9/228* (2006.01)

(52) U.S. Cl.
CPC ............ *C08J 9/228* (2013.01); *C08J 3/226* (2013.01); *C08J 2201/03* (2013.01); *C08J 2203/22* (2013.01); *C08J 2323/12* (2013.01); *C08J 2323/16* (2013.01); *C08J 2431/04* (2013.01)

(58) Field of Classification Search
CPC ...... C08J 9/0014; C08J 9/0061; C08J 9/0066; C08J 9/0095; C08J 9/32; C08J 2201/024; C08J 2201/026; C08J 2201/03; C08J 2203/22; C08J 2323/16; C08J 2423/12; C08J 2423/16; C08L 23/16; C08L 2203/14; C08L 2310/00
See application file for complete search history.

(56) References Cited

U.S. PATENT DOCUMENTS

| | | | |
|---|---|---|---|
| 4,130,535 A | 12/1978 | Coran et al. | |
| 4,311,268 A | 1/1982 | Soliven | |
| 4,594,390 A | 6/1986 | Abdou-Sabet et al. | |
| 5,728,744 A | 3/1998 | Okada et al. | |
| 6,147,160 A | 11/2000 | Wang et al. | |
| 6,268,438 B1 | 7/2001 | Ellul et al. | |
| 6,288,171 B2 | 9/2001 | Finerman et al. | |
| 6,399,710 B1 | 6/2002 | Finerman et al. | |
| 6,713,520 B2 | 3/2004 | Sahnoune et al. | |
| 6,720,361 B2 | 4/2004 | Tasaka et al. | |
| 7,294,675 B2 | 11/2007 | Hoyweghen et al. | |
| 7,319,121 B2 | 1/2008 | Jacob | |
| 7,326,471 B2 | 2/2008 | Shaw | |
| 7,652,097 B2 | 1/2010 | Nonaka et al. | |
| 7,829,623 B2 | 11/2010 | Ouhadi et al. | |
| 7,964,672 B2 | 6/2011 | Ouhadi | |
| 8,178,625 B2 | 5/2012 | Ellul et al. | |
| 2010/0119855 A1 | 5/2010 | Ouhadi et al. | |
| 2013/0072584 A1 | 3/2013 | Gopalan et al. | |
| 2013/0101826 A1 | 4/2013 | Haug et al. | |

FOREIGN PATENT DOCUMENTS

| | | |
|---|---|---|
| CN | 104072881 A | 10/2014 |
| JP | 2005-088718 A | 4/2005 |
| JP | 3964669 B | 12/2006 |
| JP | 4660016 B | 3/2011 |
| JP | 5481278 B | 4/2014 |
| JP | 5972200 B | 12/2015 |
| KR | 20160083324 A | 7/2016 |
| WO | 2004/016679 A | 2/2004 |
| WO | 2007/044123 A | 4/2007 |
| WO | 2010/062113 A | 6/2010 |
| WO | 2013/062685 A | 5/2013 |
| WO | 2015/095987 A | 7/2015 |

*Primary Examiner* — Irina S Zemel
(74) *Attorney, Agent, or Firm* — Chad A. Guice (57) ABSTRACT

The present disclosure relates to thermoplastic vulcanizate (TPV) compositions and foaming agent masterbatches suitable for foaming, as well as foamed TPV compositions, methods of making the foregoing, and applications of various foamed TPV compositions. In particular, the present disclosure provides foaming agent masterbatches having unconventionally lower loading of foaming agent in carrier polymer. The carrier polymer may advantageously comprise or be a plastomer and/or propylene-based elastomer that is also suitable for inclusion in the TPV composition, and foaming the TPV composition may include the use of relatively greater amounts of foaming agent masterbatch. The use of greater amounts of foaming agent masterbatch with lower loading may allow for superior distribution of the foaming agent in the TPV composition during foaming, leading to greater uniformity of extent of foaming (e.g., as may be shown through greater uniformity of specific gravity in the foamed TPV composition).

16 Claims, 1 Drawing Sheet

FOAMING AGENT MASTERBATCHES FOR FOAMING THERMOPLASTIC VULCANIZATES

PRIORITY CLAIM

This application claims the benefit of Provisional Application No. 62/439,912, filed Dec. 29, 2016, the disclosure of which is incorporated herein by reference.

CROSS REFERENCE TO RELATED APPLICATIONS

This application relates to concurrently filed Provisional Application No. 62/439,914, filed Dec. 29, 2016 and entitled "Thermoplastic Vulcanizates for Foaming Applications."

FIELD OF THE INVENTION

This invention relates to foamed thermoplastic vulcanizate compositions and foaming agent masterbatches suitable for forming such foamed compositions, and to methods of foaming using such masterbatches, as well as making thermoplastic vulcanizate compositions, foamed compositions, and articles derived therefrom.

BACKGROUND OF THE INVENTION

Thermoplastic elastomers (TPE) are both elastomeric and thermoplastic. They are distinguished from thermoset rubbers which are elastomeric but not thermoplastic due to the cross-linking or vulcanization of the rubber, and are distinguished from general thermoplastics which are generally stiff and hard, but not elastomeric.

Thermoplastic vulcanizates (TPVs) are a class of TPE in which cross-linked rubber forms a dispersed, particulate, elastomeric phase within a thermoplastic phase of a stiff thermoplastic such that TPE properties are achieved. TPVs or TPV compositions are conventionally produced by dynamic vulcanization. Dynamic vulcanization is a process whereby a rubber component is crosslinked, or vulcanized, under intensive shear and mixing conditions within a blend of at least one non-vulcanizing thermoplastic polymer component at or above the melting point of that thermoplastic. Typically, the rubber component forms cross-linked, elastomeric particles dispersed uniformly in the thermoplastic. See, for example, U.S. Pat. Nos. 4,130,535; 4,311,268; 4,594,390; and 6,147,160. Dynamically vulcanized thermoplastic elastomers consequently have a combination of both thermoplastic and elastic properties. Conventional plastic processing equipment can extrude, inject, or otherwise mold, and thus press and shape TPV compositions into useful products alone or in composite structures with other materials.

TPEs and TPVs can be foamed by incorporating a modifier or filler or other components. See, for instance, WIPO Publications WO2004/016679 and WO2007/0044123. WO 2013/062685 suggests the use of thermo-expandable microspheres in creating foamed TPV compositions, asserting that such foamed compositions will have homogeneous closed cell structures, and may therefore exhibit superior relaxation performance, low water absorption, and desirably soft touch. Other references of potential interest along these and similar lines include: WIPO Publication WO2015/095987; U.S. Pat. Nos. 5,728,744, 6,268,438, 6,288,171, 6,399,710, 6,720, 361, 6,713,520, 7,294,675, 7,319,121, 7,326,471, 7,652,097, 7,829,623, 7,964,672, and 8,178,625; US patent publications US2010/0119855, US2013/0101826, US2013/072584; Japanese patents JP5972200B, JP4660016B, JP3964669B, JP5481278B; Japanese Patent Publication No. 2005-088718; Chinese patent publication CN104072881A; Korean patent publication KR20160083324A; and Korean patent KR101013827B.

However, using thermo-expandable microspheres in foaming TPVs presents some challenges that have not yet been adequately addressed. These microspheres are typically very small, dust-like particles, which can be very difficult to introduce to an extruder or other like apparatus for foaming a TPV composition with the microspheres. As such, the microspheres are frequently provided in the form of a masterbatch comprising microspheres dispersed in carrier polymer, which makes for significantly easier handling and introduction to the foaming/blending process. However, using such a masterbatch creates its own difficulties. Relatively small amounts of microsphere are typically blended with TPVs to make the foamed TPV, which makes it difficult to achieve homogeneous distribution of the microspheres within the TPV. This in turn leads to non-uniform properties, for instance, non-uniform specific gravity. This non-uniformity may be exhibited, for instance, along the profile of an article or other material formed form the foamed TPV, and/or among articles, TPV pellets, or the like produced at different times during a production run in a commercial-scale manufacturing facility.

Therefore, it would be highly desirable to find a suitable means of increasing dispersion of microsphere masterbatch in a TPV composition during blending/foaming.

SUMMARY OF THE INVENTION

In some aspects, the present invention relates to compositions and methods suitable for homogeneous distribution of thermo-expandable microspheres in TPV compositions. Embodiments according to these aspects may include TPVs and TPV compositions having more uniform properties (e.g., specific gravity) along the profile of an extruded article, or in comparison among TPV pellets or the like having the same formulation and produced at different times.

For instance, in various aspects, the invention provides an alternative foaming agent masterbatch, as well as methods of making and using the masterbatch, and foamed and non-foamed TPV compositions to be used with, and/or that comprise, the masterbatch. The masterbatch includes 5 to 95 wt %, preferably 30 to 80 wt %, thermo-expandable microspheres in a carrier polymer that are capable of being melt-processed at temperatures below the initiation temperature of the thermo-expandable microspheres (i.e., the temperature at which expansion of the microspheres is triggered). Thus, for instance, where initiation temperature of the microspheres is within the range from 130° to 150° C., the carrier polymer is preferably melt-processable at temperatures less than 130° C. The carrier polymer preferably comprises one or more of propylene-based elastomer ("PBE"), propylene-based plastomer, and homopolypropylene. Most conveniently, the carrier polymer comprises, or is, a PBE. The PBE preferably has at least 60 wt % propylene-derived units and about 5 to 25 wt % units derived from a $C_2$ or $C_4$-$C_{12}$ α-olefin (preferably ethylene), based on total weight of the propylene-based elastomer, and a heat of fusion of less than about 80 J/g. In some embodiments, the PBE may also desirably have low MFR, e.g., 10 or less, more preferably 5 or less, such as within the range from 1 to 5 or 2 to 4.

Such a masterbatch provides several advantages. For instance, the homopolypropylene, propylene-based plastomer, and/or PBE are each compatible with, and readily blended into, the TPV's thermoplastic phase, enabling better distribution of the thermo-expandable microsphere masterbatch when processing TPV compositions with such masterbatch. In addition, the invention according to some aspects includes low-loading masterbatch, e.g., masterbatch comprising 5 to 30 wt % thermo-expandable microspheres, such as 7 to 20 wt %, such wt % s based on the total weight of the masterbatch. Such low-loading masterbatch may permit blending relatively greater amounts of masterbatch with a TPV composition in order to obtain a given desired specific gravity in the foamed TPV composition (e.g., 3 wt % or more, such as within the range from 3 to 10 wt % foaming agent masterbatch with 97 wt %, such as 90 to 97 wt %, TPV composition), as compared to the amount of masterbatch needed to obtain the same given specific gravity with a more highly-concentrated foaming agent masterbatch. For instance, by comparison, a more typical foaming agent masterbatch having 65 wt % thermo-expandable microspheres might only require about 1 to 2 wt % masterbatch blended with 98 to 99 wt % TPV composition to obtain a desired specific gravity. This enables better mixing of the masterbatch with the TPV composition, thereby increasing uniformity of properties across multiple different product campaigns, and/or within a single processed article made from the foamed TPV composition.

The invention in yet further aspects resides in methods of foaming a TPV composition utilizing such above-discussed foaming agent masterbatches. Such methods may include blending (e.g., co-extruding, melt-mixing, or the like) (a) a TPV composition and (b) a foaming agent masterbatch so as to form a foamed TPV composition. The foaming agent masterbatch may be in accordance with any of the above-described embodiments.

DETAILED DESCRIPTION OF SPECIFIC EMBODIMENTS

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

Definitions

As used herein, a "polymer" may be used to refer to homopolymers, copolymers, interpolymers, and terpolymers. Homopolymers are polymers made from a single type of monomer (e.g., homopolypropylene, made from propylene). Unless context indicates otherwise, "copolymers" may refer to polymers made from two or more types of monomers (including both, e.g., ethylene-propylene copolymers and ethylene-propylene-polyene terpolymers, as well as tetrapolymers, and polymers made from 5 or more monomer types); and "terpolymers" refer to a sub-set of copolymers made from three monomer types (e.g., ethylene-propylene-polyene terpolymers).

As used herein, when a polymer is referred to as comprising a monomer, the monomer is present in the polymer in the polymerized form of the monomer or in the derivative form of the monomer.

As used herein, when a polymer composition or blend is said to comprise a certain percentage, wt %, of a monomer, that percentage of monomer is based on the total amount of monomer units in all the polymer components of the composition or blend, unless otherwise stated.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)," unless noted otherwise.

As used herein, a "$C_x$" hydrocarbon or α-olefin or the like, where x is an integer, refers to a hydrocarbon, α-olefin, or the like having X carbon atoms. Thus, a $C_6$ α-olefin is an α-olefin having 6 carbon atoms (with a double bond connecting the 1 and 2 carbons). Similarly, a "$C_x$-$C_y$ α-olefin" or a "$C_{x-y}$ α-olefin" is an α-olefin having from x to y carbon atoms, inclusive (e.g., a $C_6$-$C_{10}$ or $C_{6-10}$ α-olefin is an α-olefin having 6, 7, 8, 9, or 10 carbon atoms).

As used herein, a composition "free of" a component refers to a composition substantially devoid of the component, or comprising the component in an amount of less than about 0.01 wt. %, by weight of the total composition.

As used herein, a "thermoplastic vulcanizate" is broadly defined as any material that includes a dispersed, at least partially vulcanized, rubber component within a thermoplastic resin component. A thermoplastic vulcanizate material can further include additive oil, other ingredients, other additives, or combinations thereof.

As used herein, the term "vulcanizate" means a composition that includes some component (e.g., rubber) that has been vulcanized. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization, e.g., curing (crosslinking) that results in a measurable change in pertinent properties, e.g., a change in the melt flow index (MFI) of the composition by 10% or more (according to any ASTM-1238 procedure). In at least that context, the term vulcanization encompasses any form of curing (crosslinking), both thermal and chemical, which can be utilized in dynamic vulcanization.

As used herein, the term "dynamic vulcanization" means vulcanization or curing of a curable rubber component blended with a thermoplastic resin component under conditions of shear at temperatures sufficient to plasticize the mixture. In at least one embodiment, the rubber component is simultaneously crosslinked and dispersed as micro-sized particles within the thermoplastic resin component. Depending on the degree of cure, the rubber component to thermoplastic resin component ratio, compatibility of the rubber component and thermoplastic resin component, the kneader type and the intensity of mixing (shear rate), other morphologies, such as co-continuous rubber phases in the plastic matrix, are possible.

As used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the TPV. For example, in a TPV comprising a partially vulcanized rubber at least 5 wt % and less than 10, 20, 30, or 50 wt % (in varying embodiments) of the crosslinkable rubber is extractable from the specimen of the TPV in boiling xylene (said wt % based upon the total weight of rubber present in the TPV specimen). The percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in Column 4, lines 19-50 of U.S. Pat. No. 4,311,628, which description is hereby incorporated by reference.

As used herein, a "fully vulcanized" (or fully cured or fully crosslinked) rubber is one wherein less than 5 wt % of the crosslinkable rubber is extractable in boiling xylene, subsequent to vulcanization (preferably dynamic vulcanization), e.g., crosslinking of the rubber phase of the TPV. For example, in a TPV comprising a fully vulcanized rubber, less than 4, 3, 2, or even 1 wt % of the crosslinkable rubber is extractable from the specimen of the TPV in boiling xylene. In some embodiments, in a TPV comprising a fully vulcanized rubber, from 0.5 to 2.0 wt %, such as from 0.1 to 2.0 wt %, of the crosslinkable rubber is extractable from the specimen of the TPV in boiling xylene.

As used herein, "extender oil" and "processing oil" may have similar compositions, or be selected from the same or similar compounds. The terms are used to distinguish the timing in the manufacturing cycle of elastomeric compositions (including TPVs) at which the oil is introduced. "Extender oil" is oil that is added to or otherwise incorporated with an elastomer following its polymerization, e.g., incorporated (along with any other desired additives) as part of the elastomer pellets, bales, or the like that are shipped or otherwise provided to downstream manufacturers, who in turn process the elastomer into intermediate products (including TPVs) and/or finished goods. "Processing oil" or "process oil" is formulated with the elastomer during such downstream manufacturing (e.g., during extrusion, mixing, or other processing of the elastomer, including formation into a TPV). Thus, in the context of thermoplastic vulcanizate compositions, such as those discussed herein, "extender oil" may be present in a rubber component used in manufacturing the TPV; "process oil" is oil that is added during the TPV manufacturing process. Sometimes, the total of both extender oil and process oil may be cumulatively referred to as "additive oil."

As used herein, a "Group I oil", a "Group II oil", a "Group III oil", a "Group IV oil" (also referred to as a polyalphaolefin or "PAO") and a "Group V oil" refer to the respective base stock oil group as understood in accordance with the American Petroleum Institute (API)'s categorization of base stock oils (set forth in Annex E of API 1509, 17th Edition, Addendum 1 (March 2015), incorporated herein by reference). For instance, a Group I oil is a petroleum-derived base oil or basestock oil having less than 90 wt % saturates (as determined in accordance with ASTM D2007), greater than 300 wppm sulfur (as determined in accordance with ASTM D1552, ASTM D2622, ASTM D3120, ASTM D4294, or ASTM D4297, with ASTM D4294 prevailing in case of conflicting results among those methods), and having a viscosity index ranging from 80 to 120 (as determined by ASTM D2270). Likewise, a Group II oil is a petroleum-derived base oil or basestock oil having greater than or equal to 90 wt % saturates, less than or equal to 300 wppm sulfur content, and a viscosity index ranging from 80 to 120 (each property determined by the same methods identified for Group I oils). Group III, IV, and V oils are similarly in accordance with their description in Annex E of API 1509.

Foamed TPV Compositions

Various embodiments of the present invention include (i) combining 80 to 97 wt % (such as 85 to 96 wt %, or 88 to 95 wt %) of a TPV composition with 3 to 20 wt % (such as 4 to 15 wt %, or 5 to 12 wt %) foaming agent masterbatch (such wt % s based on the mass of TPV and foaming agent masterbatch combined, and exclusive of any other optional ingredients combined therewith), and (ii) forming a foamed TPV composition therefrom. In various embodiments wt % ranges from any of the foregoing lows to any of the foregoing highs (e.g., 85 to 97 wt % TPV composition and 3 to 15 wt % foaming agent masterbatch) are also contemplated. Preferred foamed TPV compositions include (i) an at least partially vulcanized rubber component dispersed in a thermoplastic component comprising a thermoplastic resin (e.g., homopolypropylene), (ii) oil, and (iii) optionally, one or more additives. The thermoplastic component of particularly preferred foamed TPV compositions further includes a propylene-based elastomer (PBE) and/or a plastomer (e.g., a propylene-α-olefin random copolymer).

At least a portion of the thermoplastic component and/or PBE of foamed TPV compositions preferably comes from the carrier polymer of the foaming agent masterbatch. Thus, in particular methods and compositions according to the just-noted embodiments, the TPV composition comprises: (i) an at least partially vulcanized rubber component dispersed in a thermoplastic component comprising (a) a thermoplastic resin, and (b) optionally, one or more of a plastomer and a PBE; (ii) oil; and (iii) optionally, one or more additives. Further, the foaming agent masterbatch of such embodiments includes thermo-expandable microspheres in a carrier polymer, and the carrier polymer comprises a further portion of the plastomer and/or PBE (preferably a further portion of the PBE). By using a desired ingredient of the TPV composition (e.g., the plastomer and/or PBE) as the carrier polymer of the foaming agent masterbatch, one can advantageously reduce the loading of the masterbatch and concomitantly increase the amount of masterbatch blended with the TPV for foaming, so as to achieve superior dispersion of the foaming agent while not detrimentally impacting the resulting foamed TPV composition. In some embodiments, only a portion of the desired ingredient on the TPV comes from the masterbatch carrier polymer (e.g., such that a portion of PBE is present in the TPV composition, and a further portion of PBE is present in, and/or used as, the carrier polymer). In yet other embodiments, all of the desired ingredient may come from the masterbatch carrier polymer (e.g., such that the TPV composition comprises substantially no plastomer and/or PBE, while the carrier polymer comprises substantially all of the plastomer and/or PBE in the resulting foamed TPV composition).

Some particular embodiments therefore include: (a) combining a TPV composition with the foaming agent masterbatch (in wt %s according to the above description) and (b) forming a foamed TPV composition therefrom; wherein the TPV composition comprises: (i) an at least partially vulcanized rubber component dispersed in a thermoplastic component comprising a thermoplastic resin and, optionally a first portion of a plastomer and/or a first portion of a PBE; (ii) oil; and (iii) optionally, one or more additives. The foaming agent masterbatch of such embodiments comprises thermo-expandable microspheres in a carrier polymer. The carrier polymer comprises a second portion of the plastomer and/or a second portion of the PBE. The resulting foamed TPV composition comprises (i) the at least partially vulcanized rubber component dispersed in the thermoplastic component comprising thermoplastic resin and the plastomer and/or the PBE, (ii) the oil, and (iii) optionally, the one or more additives. The first portion of plastomer and/or first portion of PBE are each within the range from 0 to 75 wt % of the total plastomer and PBE, respectively, of the foamed TPV composition, with the second portion of plastomer and/or PBE forming the balance of the total plastomer and/or PBE of the foamed TPV composition. Preferably, the first portion of plastomer and/or first portion of PBE are each preferably within the range from 0 to 50 wt %, more preferably 0 to 30 wt %, such as 0 to 20 wt %, of the total of each such component (if present) in the foamed TPV composition. In particular embodiments, the TPV composition includes substantially no plastomer or PBE (i.e., the first portion of the identified optional ingredient is 0 wt %), such that all plastomer and/or PBE of the foamed TPV composition comes from the carrier polymer of the foaming agent masterbatch.

In some preferred embodiments, the carrier resin is a PBE, such that the TPV composition comprises an optional first portion of PBE (but need not, and in some embodiments does not, comprise any plastomer). Thus, the thermoplastic component of the TPV composition of such embodiments comprises thermoplastic resin and optionally a first portion of PBE; the carrier polymer comprises a second portion of PBE, and the thermoplastic component of the foamed TPV composition comprises the thermoplastic resin and the PBE, such that the pre-foamed TPV composition contributes 0 to 75 wt % of the total PBE in the resulting foamed TPV composition.

Whether the carrier polymer is a plastomer or PBE (or some combination thereof), preferably all of the carrier polymer is capable of being melt-processed at temperatures below the initiation temperature of the microspheres of the foaming agent masterbatch (i.e., the temperature at which expansion of the microspheres is triggered). As discussed in more detail below, preferred initiation temperatures are at least 100° C., 110° C., or 120° C., preferably at least 130° C. or even 140° C. Therefore, it is preferred that the carrier polymer is capable of being melt processed at temperatures of 140° C. or less, more preferably 130° C. or less. In some embodiments, the carrier polymer is capable of being melt processed at temperatures of 120° C. or less, 110° C. or less, or even 100° C. or less. Thus, suitable carrier polymers have melting point $T_m$ of 130° C. or less, more preferably 120° C. or less, such as 110° C. or less or even 100° C. or less (determined as described in Col. 20, lines 35-53 of U.S. Pat. No. 6,342,565, which description is incorporated by reference herein).

Suitable means for forming the foamed TPV composition are first discussed below, followed by detailed discussion of (i) suitable foaming agent masterbatch and (ii) TPV compositions according to various embodiments.

Forming Foamed TPV Compositions

Forming the foamed TPV composition may include the use of any molding or continuous extrusion means for forming and shaping polyolefins known in the art. Some of these means may advantageously also serve the function of combining the TPV composition and foaming agent (and any optional further additives). For instance, coextrusion of TPV composition and foaming agent may be used both (i) to combine these components and (ii) to form the foamed TPV composition. Alternatively, however, the components may be combined beforehand, e.g., in a blender, melt-mixer, or the like, and then fed to an extruder or other like apparatus for forming the foamed composition.

Examples of suitable molding or continuous extrusion means include: sheet extrusion, profile extrusion or co-extrusion, compression molding, injection molding, co-injection molding, gas-assisted injection molding, transfer molding, foam molding, transfer molding, vacuum forming, lamination, calendering, or other forms of processing such as described in, for example, "Rubber Technology," by Maurice Norton (Van Nostrand Reinhold—New York), or combinations thereof. Among these, extrusion including co-extrusion is particularly suitable for forming the foamed material of various embodiments of the present invention.

Foamed TPV compositions of various embodiments may have specific gravity within the range from 0.40 g/cc to 0.80 g/cc, such as within the range from 0.60 to 0.75 g/cc, or 0.68 to 0.70 g/cc, with ranges from any of the foregoing lows to any of the foregoing highs also contemplated in various embodiments. Specific gravity should be measured in accordance with ASTM D-792.

The foamed TPV composition's physical properties, and in particular its tensile properties, will vary depending upon the specific gravity to which the TPV is foamed. However, foamed TPV compositions according to some embodiments, when foamed to specific gravity within the range from 0.68 to 0.70 g/cc, may exhibit one or more (preferably two or more, such as all) of the following properties:

Modulus at 100% elongation ("M100") within the range from 3.00 to 3.75 MPa. The M100 measures the force required to maintain a sample of the foamed TPV composition at 100% elongation, per cross-sectional area of the un-elongated sample. It indicates the degree of flexibility/stiffness of the article; a balance between excessive flexibility and excessive stiffness is desired for many foamed TPV applications;

Ultimate tensile strength (UTS) of at least 2.5 MPa, such as within the range from 2.50 to 6.00 MPA. UTS indicates the tensile strength of a sample upon breakage after being stretched at a specified rate until breakage; and Tension Set (TS) measured per ASTM D-412 (Die C, 100% strain for 22 hrs at 70° C., quiescent relaxation for at least 12 hours) of at most 90%, preferably at most 85%, or at most 82%, such as within the range from 50% to 80%, or 55% to 75%, with ranges from any of the foregoing lows to any of the foregoing highs also contemplated in various embodiments. Tension Set measures both the elastic stretch and recovery capabilities of the foamed TPV composition by measuring elongation remaining in a compression-molded specimen after it has been stretched and allowed to recover per the procedures of ASTM D-412 as summarized above. For instance, a 50% TS value means that starting with a 1-inch length sample, after straining to 2 inches (a 100% strain), the sample shrinks back to 1.5 inches. Lower values are preferred, indicating less permanent deformation resulting from the exerted strain at the recited conditions.

M100 and UTS are both measured on injection molded plaques according to ASTM D-412 (Die C) at 23° C. (unless otherwise specified) at 50 mm per minute by using an Instron testing machine.

Foaming Agent Masterbatch

Various embodiments provide a foaming agent masterbatch. The foaming agent masterbatch preferably comprises 5 to 30 wt % thermo-expandable microspheres in 70 to 95 wt % carrier polymer. Masterbatches according to certain embodiments may include 7 to 25 wt %, such as 8 to 20 wt %, or 9 to 19 wt % thermo-expandable microspheres in 75 to 93 wt %, such as 80 to 92 wt %, or 81 to 91 wt % carrier polymer, with ranges from any of the foregoing lows to any of the foregoing highs also contemplated in various embodiments.

The carrier polymer preferably comprises a plastomer and/or a PBE. Most preferably, the carrier polymer comprises a PBE. Suitable plastomers and/or PBEs are in accordance with the discussions below of each respective ingredient suitable for TPV compositions. Preferably, the same plastomer and/or PBE is used in the TPV composition as is used in the foaming agent masterbatch for foaming the TPV composition (where such ingredients are present in the pre-foamed TPV composition).

A thermo-expandable microsphere is broadly defined as a microsphere comprising a polymer shell and a propellant encapsulated therein. Examples are known in the art and described in, for example, U.S. Pat. Nos. 6,582,633 and 3,615,972, WO 99/46320 and WO 99/43758, and contents of which hereby are incorporated by reference. Examples of such thermo-expandable microsphere include, for example, EXPANCEL™ products commercially available from Akzo Nobel N.V., such as EXPANCEL™ 950MB80 (a masterbatch containing microcapsules in ethylene vinyl acetate (EVA) copolymer carrier).

A polymer shell is any shell-like structure made from a polymer. It can be hollow, filled, or partially filled such as with a propellant. The propellant can be any liquid having a boiling temperature not higher than the softening temperature of the thermoplastic polymer shell. Expansion of the thermoplastic microspheres is typically physical by nature. It is believed that as the propellant is heated up, the propellant expands, increases the intrinsic pressure, at the same time the shell softens, thus causes the microspheres' expansion, normally from about 2 to about 8 times their diameter, or about 30 to about 80 times volume, and the thickness of polymer shell may decrease to 0.1 μm or even thinner Factors that may affect the expandability of the microspheres include volatility of the encapsulated propellant, gas permeability, and viscoelasticity of the polymer shell.

Various monomers are suitable for preparation of the polymer shell and may comprise acrylonitrile, methacrylonitrile, α-haloacrylonitrile, α-ethoxyacrylonitrile, fumaronitrile, acrylic esters or any combinations thereof. In one preferable embodiment, the monomer is made from polyacrylonitrile. The polymer shell may have a softening temperature, i.e., the glass transition temperature (Tg) ranging from about 80° C. to about 200° C.

The liquids suitable for preparation of the propellant of the thermo-expandable microsphere usually have a boiling point lower than the softening temperature of the polymer shell at atmosphere pressure. Suitable liquids include, but not limited to, isobutane, 2,4-dimethylbutane, 2-methylpentane, 3-methylpentane, n-hexane, cyclohexane, heptane, isooctane, or any combinations thereof.

When a thermo-expandable microsphere is heated up, it starts to expand at a certain temperature. The temperature at which the expansion starts is called the initiation temperature, or $T_{initiation}$, while the temperature at which the maximum expansion is reached is called $T_{max}$. The $T_{initiation}$ and $T_{max}$ can be measured by thermo-mechanical analysis (TMA) of thermo expansion property. Suitable thermo-expandable microspheres may have a $T_{initiation}$ of at least about 100° C., preferably at least about 110° C. or 120° C., more preferably at least 130° C., or even at least 140° C., and a $T_{max}$ of less than 300° C., more preferably less than about 260° C., 240° C., 220° C., or 210° C.

Thermo-expandable microspheres suitable for foamed TPV compositions of some embodiments may have various pre-expansion average particle sizes. In some embodiments, the average particle size may range from about 1 μm to about 500 μm, preferably from about 2 μm to about 300 μm, more preferably from about 4 μm to about 100 μm, and most preferably from about 5 μm to about 50 μm. The average particle size of the expandable microsphere, after expansion, is preferably not less than about 50 μm, preferably no less than about 80 μm, more preferably no less than about 100 μm, and most preferably not less than about 120 μm.

The production of thermo-expandable microsphere can be any methods comprising a step of polymerizing the monomers in an aqueous suspension in the presence of a propellant, and are known as described in the earlier publication, for example, U.S. Pat. No. 3,615,972, WO 99/46320, and WO 99/43758, and contents of which are hereby incorporated by reference.

As noted, due to the small size of the microspheres, it may be preferable to utilize the microspheres in masterbatch form. As also noted, the carrier polymer for the masterbatch is preferably a thermoplastic resin or propylene-based elastomer.

Further, although the microspheres may be blended with a TPV composition with the aid of compatibilizers (e.g., graft copolymers), as described in WO 2013/062685, in some embodiments of the present invention, it is preferred that the TPV composition be foamed with microspheres without the use of a compatibilizer (e.g., graft copolymers), as this avoids needless complication of the formulation, while still achieving excellent results in the foamed composition.

Finally, alternative foaming agents are contemplated in yet further embodiments. For instance, any chemical foaming agent may be suitable for practice of various embodiments of the present invention. Such chemical foaming agents decompose at elevated temperatures to form gases or vapors to blow the polymer into foam form. These agents allow reduction in cost of raw materials. The agent preferably takes a solid form, so it is conveniently dry-blended with the polymer material.

Chemical foaming agents include, but are not limited to, organic foaming agents, such as 4,4'-oxybis benzene sulfonyl hydrazide; azodicarbonamide; azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic foaming agents such as ammonium bicarbonate and sodium bicarbonate. Specifically, the foaming agent can be azodicarbonamide. A gas, such as air, nitrogen, carbon dioxide, etc., may also be injected into the composition during the injection molding process. Examples of such alternative foaming agents can include those commercially available under the trade names HYDROCERAL® (Clariant International Ltd.), CELOGEN™ (Chemtura Corporation, Philadelphia, Pa., USA), GENITRON™, POROFOR™, FICEL™ (Lanxess AG, Germany), SUVA™, DYMEL™, FORMACEL™, ZYRON™ (DuPont Chemical Company, Wilmington, Del., USA), and PLANAGEN™ (INBRA S.A., Brazil).

Thermoplastic Vulcanizate Compositions

Thermoplastic vulcanizate (TPV) compositions of various embodiments may comprise, consist essentially of, or consist of: (a) an at least partially vulcanized rubber component dispersed within a continuous thermoplastic matrix comprising thermoplastic resin and, optionally, propylene-based elastomer; (b) oil; and (c) optionally, one or more additives (e.g., one or more fillers, foaming agents, or the like). As used in this context, "consist essentially of" means that the TPV composition is free of other materials except those minor impurities (e.g., 0.1 wt % or less) that one would typically expect in normal commercial operations. For instance, a single process line may be used to in a continuous process to create multiple different types of materials in series, and some residuals (e.g., residual polymer, monomer, curative, additives, or other material) from previous product campaigns may acceptably be left in such equipment.

Such TPVs are formed by dynamically vulcanizing a TPV formulation. The TPV formulation of various embodiments comprises (i) a rubber component (which may or may not be oil-extended), (ii) a thermoplastic resin, (iii) optionally, a PBE, (iv) a vulcanizing agent or curative; (v) processing oil; and (vi) optionally, one or more additives (including, e.g., cure accelerators, metal oxides, acid scavengers, flame retardants, fillers, stabilizers, and the like). The TPV may therefore alternatively be considered the product of dynamic vulcanization of the TPV formulation.

Formation of the TPV and its resultant properties will first be described, followed by a more detailed description of suitable rubber components, thermoplastic components, vulcanizing agents, processing oil, and additives.

Forming TPVs

As those skilled in the art appreciate, dynamic vulcanization includes a process whereby a rubber that is undergoing mixing with a thermoplastic resin is cured. The rubber is crosslinked or vulcanized under conditions of high shear at a temperature above the melting point of the thermoplastic resin. As a result of the process, the thermoplastic resin becomes the continuous phase of the mixture and the rubber becomes dispersed as a discontinuous phase within the continuous thermoplastic phase. Thus, in some embodiments, the mixture (e.g., the TPV formulation) undergoes a phase inversion during dynamic vulcanization, where the blend, which initially includes a major volume fraction of rubber, is converted to a blend where the plastic phase is the continuous phase and the rubber is simultaneously crosslinked and dispersed as fine particles within the thermoplastic matrix.

In general, the dynamic vulcanization of the TPV formulation takes place within a reactor, such as an extruder, melt-mixer, or other reactive mixing device (described in more detail below). Furthermore, not all components of the TPV formulation need necessarily be introduced to the reactor at the same time.

For instance, dynamic vulcanization according to some embodiments proceeds as follows: The rubber component, thermoplastic component, and (optionally) PBE are mixed to form a blend, which may be referred to as a solids blend (although not all components of the blend need necessarily be in the solid state). Optional solid additives, such as cure accelerator, fillers, zinc oxide, and miscellaneous solids such as pigments and antioxidants, may be added to the solids blend. The blend is continually mixed at a temperature above the melt temperature of the thermoplastic resin to form a molten blend. The vulcanizing agent (e.g., curative), which may be in the form of a solid or a liquid, is introduced to the molten blend to form a vulcanizable blend. Heating and mixing continues in order to effect dynamic vulcanization.

Processing oil can be introduced at any stage, or in multiple stages, of the process. For example, oil can be added to the solids blend, to the molten blend, together with the curative, or after dynamic vulcanization—or at any two or more of the foregoing points in the process.

Methods according to particular embodiments include "preloading" process oil—meaning that a portion of the process oil is introduced to the TPV formulation before the curative is introduced. Surprisingly, it was found that some degree of oil preloading resulted in increased tensile properties of the resulting TPV, without increasing hardness.

According to such embodiments, the preloaded oil (e.g., a first portion of process oil) is introduced into the molten blend of TPV formulation components before introducing the curative. Preferably, at least 15 wt %, more preferably at least 30 wt %, such as at least 40 wt %, of the total process oil used in forming the TPV is preloaded (i.e., introduced before the curative). In some embodiments, the amount of preloaded process oil is within the range from 15 to 60 wt %, such as 15 to 50 wt %, 20 to 45 wt %, or 30 to 40 wt %, with ranges from any of the foregoing low ends to any of the foregoing high ends also contemplated in various embodiments. These wt % s are based on total weight of process oil added to the TPV (which is exclusive of any extender oil that may be present in the rubber component, but which includes process oil that might be added to the process with the curative, as is the case with phenolic resin-in-oil curatives).

Following dynamic vulcanization, mixing may continue and additional additives or ingredients can be incorporated into the molten product, which may be referred to as a molten thermoplastic vulcanizate. For example, post-vulcanization additives, such as acid scavengers (and additional process oil, as noted), can be added to the molten mass following dynamic vulcanization. The product can then be extruded through an extruder die, or otherwise fabricated, and ultimately cooled for handling and/or further processing. For example, the molten thermoplastic vulcanizate composition may be cooled and/or solidified and subsequently pelletized for future storage and/or shipment. Practice of such embodiments of the present invention is not necessarily limited by the manner in which the thermoplastic vulcanizate composition is subsequently solidified or fabricated.

The process of dynamic vulcanization as described herein can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruders). Methods and equipment for continuously preparing thermoplastic vulcanizates are described in U.S. Pat. Nos. 4,311,628; 4,594,390; 5,656,693; 6,147,160; and 6,042,260, as well as WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

Rubber Component

The rubber component of TPV formulations of various embodiments is preferably a crosslinkable (vulcanizable) rubber component, such that upon dynamic vulcanization, the rubber component in the resulting TPV composition (i.e., resulting from processing, including by dynamic vulcanization, of the TPV formulation) of such embodiments is at least partially crosslinked, preferably fully crosslinked.

Any rubber suitable for use in the manufacture of TPVs can be used to manufacture (and be present in) the TPV compositions of some embodiments of the present invention. The term "rubber" refers to any natural or synthetic polymer exhibiting elastomeric properties; any may be used herein synonymously with "elastomer." The rubber component may comprise one rubber, or a mix of two or more rubbers.

For example, the rubber component can be any olefin-containing rubber such as ethylene-propylene copolymers (EPM), including in particular saturated compounds that can be vulcanized using free radical generators such as organic peroxides, as described in U.S. Pat. No. 5,177,147. Other rubber components can include ethylene-propylene-diene (EPDM) rubber, or EPDM-type rubber, for example, an EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms.

The rubber component can also be a butyl rubber. The term "butyl rubber" includes a polymer that predominantly includes repeat units from isobutylene, but also includes a few repeat units of a monomer that provides a site for crosslinking. Monomers providing sites for crosslinking include a polyunsaturated monomer such as a conjugated diene or divinyl benzene. In one or more embodiments of the invention, the butyl rubber polymer can be halogenated to further enhance reactivity in crosslinking. Those polymers are referred to as "halobutyl rubbers."

Further, the rubber component can be homopolymers of conjugated dienes having from 4 to 8 carbon atoms and rubber copolymers having at least 50 wt % repeat units from at least one conjugated diene having from 4 to 8 carbon atoms. The rubber component can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers can also be used. Examples of those include maleated EPDM, and epoxy-functionalized natural rubbers.

A list of preferred rubber component include, but are not limited to, ethylene-propylene rubber, ethylene-propylene-diene rubber, natural rubber, butyl rubber including halobutyl rubber, halogenated rubber copolymer of p-alkystyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 wt. % repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, or combinations thereof.

The rubber component is preferably present in the TPV formulation (and/or present in the resulting TPV) in an amount within the range from 10 to 40 wt %, preferably 15 to 30 wt %, such as 16 to 28 wt %, based on total weight of the TPV, with ranges from any of the foregoing low ends to any of the foregoing high ends also contemplated in various embodiments. Note that these wt % values for rubber component are exclusive of any extender oil that may be formulated with the rubber component (e.g., for ease of processing). The TPV formulation (and/or resulting TPV composition) of some embodiments may optionally comprise 5 to 30 wt %, such as 10 to 25 wt % or 12 to 24 wt % (with ranges from any of the foregoing lows to any of the foregoing highs also contemplated) of extender oil, where extender oil is present in the rubber component.

Alternatively, the rubber component amount in the TPV composition may be expressed in terms of wt % inclusive of any extender oil that may be present in the rubber component. In such cases, the rubber component (inclusive of extender oil) may be present in the TPV composition within the range from 15 to 60 wt %, preferably 20 to 50 wt %, such as 30 to 45 wt % (again, with ranges from any of the foregoing lows to any of the foregoing highs also contemplated in various embodiments).

Thermoplastic Resin

The TPV formulations and/or TPV compositions of various embodiments include at least one olefinic thermoplastic resin. The thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and polyolefin copolymers.

Illustrative thermoplastic resins may be prepared from mono-olefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non-cross-linked in the resulting TPV (i.e., it is non-vulcanizable or non-crosslinkable as present in the TPV formulation, prior to dynamic vulcanization).

In preferred embodiments, the olefinic thermoplastic resin comprises, or consists of, polypropylene. The term "polypropylene" as used herein broadly means any polymer that is considered a "polypropylene" by persons skilled in the art and includes homopolymers as well as impact, random, and other copolymers of propylene. Preferably, the polypropylene used in the TPVs described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units, with the remainder derived from one or more olefins selected from the group consisting of ethylene and $C_4$-$C_{10}$ α-olefins.

The thermoplastic resin may have a melting temperature ($T_m$) of at least 110° C., or at least 120° C., or at least 130° C., and may range from 110° C. to 170° C. or higher as measured by differential scanning calorimetry (DSC), measured per the procedure outlined later in this application in connection with description of the propylene-based elastomer.

In some embodiments, the thermoplastic resin has MFR of 15 g/10 min or less, more preferably 10 or less, 5 or less, 3 or less, or even 1 or less, in some embodiments (measured per ASTM D-1238, at 230° C. and 2.16 kg mass). For instance, MFR of the thermoplastic resin may be within the range from a low of any one of 0.01, 0.1, and 0.5 g/10 min to a high of any one of 1, 3, 5, 10, and 15 g/10 min (ASTM D-1238, 230° C. and 2.16 kg). In certain of these embodiments, the thermoplastic resin component comprises only thermoplastic resin with MFR according to the foregoing description.

In yet other embodiments, however, the TPV composition (and/or the TPV formulation) may comprise two or more thermoplastic resins. In particular, the TPV composition may comprise (i) a thermoplastic resin having MFR of 15 g/10 min or less (or other MFR per the just-given description); and (ii) a high-MFR thermoplastic resin having MFR of greater than 15 g/10 min, for instance, within the range from greater than 15 to 50 g/10 min, preferably within the range from greater than 15 to 25 g/10 min, such as 16 to 24 g/10 min. The high-MFR thermoplastic resin may otherwise be in accordance with the above-given descriptions of suitable thermoplastic resins (e.g., with respect to monomeric constituents, melting temperature, and the like). In certain of these embodiments employing multiple thermoplastic resins, the TPV composition and/or formulation preferably includes more low-MFR thermoplastic resin than high-MFR thermoplastic resin. For instance, of the combined weight of the low-MFR and high-MFR thermoplastic resin, 51 to 99 wt % is low-MFR, such as 55 to 95 wt %, or 55 to 75 wt %, with the balance being the high-MFR thermoplastic resin.

In summary, then, TPV compositions and/or formulations according to some embodiments include a first (low-MFR) thermoplastic resin and optionally a second (high-MFR) thermoplastic resin, such that the second thermoplastic resin is present at 0 wt % to 49 wt % of the combined amount of first and second thermoplastic resin. Where the second thermoplastic resin is present, it is preferably present within the range of 1 wt % to 49 wt %, such as 5 to 49 wt %, or 10 to 35 wt %, such as 12 to 33 wt %, of the combined amount of first and second thermoplastic resin (with ranges from any of the foregoing lows to any of the foregoing highs, e.g., 1 to 33 wt %, also contemplated in various embodiments).

The combined amount of thermoplastic resin or resins (where two or more thermoplastic resins are used) in the TPV composition (and/or the TPV formulation used to form the TPV composition) may be within the range from 10 to 40 wt %, preferably 15 to 30 wt %, such as 17 to 25 wt %, with ranges from any of the foregoing low ends to any of the foregoing highs ends also contemplated in various embodiments, and with such wt % based on the total mass of the TPV composition (or TPV formulation, as applicable).

Propylene-Based Elastomer

The optional PBE may, where employed, be present in the TPV formulation (and/or resulting TPV composition) of some embodiments within the range from 3 to 20 wt %, preferably from 4 to 15 wt %, such as 4 to 12 wt % or 5 to 10 wt %, with ranges from any of the foregoing lows to any of the foregoing highs also contemplated in various embodiments. Although it is possible to blend (e.g., coextrude, melt-mix or the like) PBE with a vulcanized TPV material to form the resulting TPV, it is preferred that the PBE be present in the TPV formulation prior to dynamic vulcanization (that is, preferred TPVs are formed such that the PBE is present in the TPV formulation at the time of dynamic vulcanization, and preferred methods include dynamic vulcanization in the presence of the PBE).

Preferred PBEs are those in accordance with the propylene-based elastomer described in Paragraphs [0055] to [0075] of WIPO Patent Publication No. WO 2015/095987 having international filing date 24 Dec. 2013, which description is incorporated by reference herein. As set forth therein, the PBE preferably has reduced crystallinity and/or melting point as compared to highly isotactic polypropylene due to introduction of errors in the insertion of propylene. The PBE is generally devoid of any substantial intermolecular heterogeneity in tacticity and comonomer composition, and also generally devoid of any substantial heterogeneity in intramolecular composition distribution.

Particularly preferred PBEs in accordance with that description for use in embodiments of the present invention include copolymers of propylene and one or more comonomers selected from the group consisting of ethylene and $C_4$-$C_{10}$ α-olefins; most preferred are propylene-ethylene copolymers. The PBE has at least 60 wt % units derived from propylene (based on total mass of the PBE), such as within the range from a low of any one of 60, 65, 70, 75, 80, 84, and 85 wt % to a high of any one of 85, 90, 92, 94, and 95 wt %, provided the high end of the range is greater than the low end. The balance of the PBE is preferably derived from ethylene, although in some embodiments the PBE may include one or $C_4$-$C_{10}$ comonomers instead of or in addition to ethylene.

Preferred PBEs have one or more, preferably two or more or three or more, most preferably four or more, or all, of the following properties:

MFR of 1 to 20 g/10 min (ASTM D-1238, 230° C. and 2.16 kg). Most preferably, however, MFR of the PBE is within the range from 1 to 10, more preferably within the range from a low of 1 or 2 g/10 min to a high of 4 or 5 g/10 min;

Melting point $T_m$ as determined by DSC of 105° C. or less, such as within the range from 25° C., 60° C., 70° C., or 90° C. to 105° C.;

Heat of fusion ($H_f$) as determined by DSC of 80 J/g or less, such as within the range from a low of any one of 1, 3, 5, 6, and 7 J/g to a high of any one of 30, 35, 40, 45, 50, 60, 70, 75, and 80 J/g;

Triad tacticity of three propylene units, as measured by $^{13}$C NMR, of at least 75%, such as within the range from 75, 80, 82, or 85% to 97% or 99%; and Density of 0.850 g/cc to 0.900 g/cc (measured at room temperature per ASTM D1505).

The DSC procedures for determining $T_m$ and $H_f$ include the following. The polymer is pressed at a temperature of from 200° C. to 230° C. in a heated press, and the resulting polymer sheet is hung, under ambient conditions (of 20-23.5° C.), in the air to cool. 6 to 10 mg of the polymer sheet is removed with a punch die. This 6 to 10 mg sample is annealed at room temperature (22° C.) for 80 to 100 hours. At the end of this period, the sample is placed in a DSC (Perkin Elmer Pyris One Thermal Analysis System) and cooled at a rate of about 10° C./min to −30° C. to −50° C. and held for 10 minutes at −50° C. The sample is heated at 10° C./min to attain a final temperature of 200° C. The sample is kept at 200° C. for 5 minutes. Then a second cool-heat cycle is performed, using the same conditions described above. Events from both cycles, "first melt" and "second melt", respectively, are recorded. The thermal output is recorded as the area under the melting peak of the sample, which typically occurs between 0° C. and 200° C. It is measured in Joules and is a measure of the $H_f$ of the polymer. $T_m$ is the temperature of greatest heat absorption (i.e., the temperature corresponding to the highest peak) in the range of melting during the first melt cycle.

Some embodiments may include one or more different PBEs, i.e., propylene-based elastomers each having one or more different properties such as, for example, different comonomer or comonomer content. Such combinations of various propylene-based elastomers are all within the scope of the invention.

Examples of the propylene-based elastomers may be those available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands).

Plastomer

Suitable plastomers, which may optionally be present in the thermoplastic component of a TPV composition and/or TPV formulation of some embodiments (and which furthermore may be included in, or used as, a carrier polymer of some embodiments) include copolymers of ethylene and one or more $C_3$ to $C_{10}$ α-olefins, and having density less than 0.915 g/cm$^3$ (such as within the range from 0.85 to 0.915 g/cm$^3$) and melt index (MI) between 0.10 and 20 dg/min (ASTM D-1238 at 190° C., 2.16 kg load). Plastomers can also be described as metallocene catalyzed copolymers of ethylene and higher α-olefin comonomers such as propylene, 1-butene, 1-hexene and 1-octene, and which contain enough of one or more of these comonomers to yield a density between 0.85 and 0.915 g/cm$^3$. Melting point $T_m$ of suitable plastomers is less than 110° C., preferably 100° C. or less, such as 95° C. or less (where $T_m$ is determined in the same manner as indicated herein for PBEs).

Oil

TPVs (and TPV formulations used in making the TPVs) may further comprise oil, including process oil (added to the TPV formulation, as described previously) and/or extender oil (which may be present in the rubber component included in the TPV formulation, also as described previously). The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials. In particular embodiments, oil included in the TPV is selected based on API groupings (e.g., a API Group I, Group II, Group III, Group IV, or Group V base stock oil may be used as the oil in the TPV). In particular embodiments, oil included in the TPV comprises Group II or higher oil, such as Group II oil (e.g., ParaLux™ 6001R process oil, available from ChevronTexaco Corp.). Also or instead, the oil could include white oil (e.g., pharmaceutical grade oil, such as Primol™ 542 medicinal grade white oil, available from ExxonMobil Chemical Company, Baytown, Tex.).

Process oil may be added to a TPV formulation (and/or may be present in a resulting TPV composition) in total amounts ranging from 5 to 200 phr (parts by weight per 100 parts by weight rubber component), preferably 50 to 150 phr, such as 75 to 125 phr, with ranges from any of the foregoing lows to any of the foregoing highs also contemplated in various embodiments. Put in terms of wt %, process oil may be added to the TPV formulation and/or present in the TPV composition in amounts within the range from 5 to 40 wt %, preferably 10 to 30 wt %, such as 15 to 25 wt %, such wt % s based on total weight of the TPV formulation or TPV composition, as applicable, and with ranges from any of the foregoing lows to any of the foregoing highs also contemplated in various embodiments.

Extender oil may be present in the rubber component in amounts within the range from 0 phr to 150 phr, such as 25 to 125 phr, or 50 to 100 phr (0 to 30 wt %, preferably 10 to 25 or 12 to 20 wt %, based on total weight of the TPV formulation or TPV composition, as applicable), with ranges from any of the foregoing lows to any of the foregoing highs also contemplated.

Total additive oil (extender oil+process oil) may therefore be within the range from 5 to 350 phr (or 5 to 70 wt % based on total weight of TPV formulation or TPV composition, as applicable); preferably within the range from 150 to 250 phr (or 30 to 45 wt % based on total weight of TPV formulation or TPV composition).

Cure Agents

The TPV formulation also includes a vulcanizing agent, which may be at least in part consumed during dynamic vulcanization of the TPV formulation. Any vulcanizing agent that is capable of curing or crosslinking the rubber employed in preparing the TPV may be used. For example, where the rubber includes an olefinic elastomeric copolymer, the cure agent may include peroxides, phenolic resins, free radical curatives, and/or other curatives conventionally employed. In some embodiments, the vulcanizing agent comprises a phenolic resin, and may be, for instance, a phenolic resin-in-oil cure agent (where the oil added with the resin forms part of the process oil added to the TPV formulation during processing). Cure accelerators (e.g., metal halides such as stannous chloride, zinc oxide, and the like) may be used in the TPV formulation in conjunction with the vulcanizing agent. Particularly useful vulcanizing agents, including phenolic resins, and cure accelerators, including stannous chloride, are described in Paragraphs [0046] to [0054] of PCT Application No. PCT/US15/65048, filed Dec. 10, 2015, which description is herein incorporated by reference.

Other Additives

The TPV formulations and/or TPV compositions of various embodiments may also include one or more additives, including metal oxides, acid scavengers, reinforcing and non-reinforcing fillers and/or extenders, antioxidants, stabilizers (e.g., UV stabilizers), antiblocking agents, anti-static agents, waxes, foaming agents, pigments, flame retardants, and any other additive, such as processing aids known in the rubber compounding art. In some embodiments, the composition further comprises at least one additive selected from fillers, processing aids, curing accelerators, or combinations thereof.

For example, the TPV composition may include reinforcing and non-reinforcing fillers, antioxidants, stabilizers, antiblocking agents, anti-static agents, waxes, foaming agents, pigments, flame retardants and other processing aids (other than the process oils described above) known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV formulation and/or composition includes at least 5, 6, 7, 8, 9, or 10 wt % of one or more fillers, such as calcium carbonate, clays, silica, talc, titanium dioxide, carbon black, and blends thereof, based on the weight of the TPV formulation or composition, as applicable. In preferred embodiments, the TPV formulation and/or composition includes clay and/or carbon black in an amount ranging from a low of any one of 5, 6, 7, 8, 9, or 10 to a high of any one of 15, 16, 17, 18, 19, or 20 wt % based on the total weight of the TPV formulation or TPV composition, as applicable. In one or more embodiments, the TPV composition or formulation comprises antioxidants in an amount less than or equal to 5 wt %, or 4 wt %, or 3 wt %, or 2 wt %, or 1 wt %, or 0.5 wt %, based on the total weight of the TPV composition or formulation.

TPV Composition Properties

TPV compositions according to various embodiments have specific gravity within the range from 0.910 to 0.980 g/cc, for instance from 0.930 to 0.975 g/cc. Further, such TPV compositions preferably have hardness (Shore A, measured per ASTM D2250 with 15 sec. delay) within the range from 75 to 90, such as 80 to 87, more preferably 82 to 86, with ranges from any of the foregoing lows to any of the foregoing highs also contemplated according to various embodiments.

In addition, the TPV compositions of various embodiments exhibit one or more of the following properties (particularly where the TPV composition has hardness within the range from 82 to 86 (Shore A)):

Modulus at 100% elongation ("M100") within the range from 7 to 12 MPa, preferably 8 to 11 or 9 to 10 MPa, with ranges from any of the foregoing lows to any of the foregoing highs also contemplated in various embodiments;

Ultimate tensile strength (UTS) of at least 7 MPa, such as within the range from 7 to 15, for instance 8 to 12 or even 9 to 11 MPa, with ranges from any of the foregoing lows to any of the foregoing highs also contemplated in various embodiments; and Ultimate elongation (UE) within the range from 500% to 800%, such as 550% to 750%, or 560% to 650%, with ranges from any of the foregoing lows to any of the foregoing highs also contemplated in various embodiments.

M100, UTS, and UE are measured on injection molded plaques according to ASTM D-412 (Die C) at 23° C. (unless otherwise specified) at 50 mm per minute by using an Instron testing machine.

As noted previously, when foaming such TPV compositions, particularly with thermo-expandable microspheres, so as to obtain foamed TPV compositions of reduced gravity, it is anticipated that the foregoing tensile properties will be proportionally reduced with specific gravity.

Other Variations

In certain embodiments, the foaming agent masterbatch may include oil (e.g., any oil suitable as a process oil in the TPV), and/or one or more additives suitable for inclusion in the TPV. One goal of such embodiments is to provide a foaming agent masterbatch having specific gravity similar to (i.e., within 15%, preferably within 10%, of) specific gravity of the TPV composition. Thus, for a TPV composition having specific gravity of X g/cm$^3$, specific gravity of the foaming agent masterbatch is preferably within the range from 0.85X to 1.15X g/cm$^3$, more preferably within the range of 0.90X to 1.10X g/cm$^3$. X for the TPV composition may be in accordance with the previous description of specific gravity for TPV compositions according to various embodiments.

In some of these embodiments, the foaming agent masterbatch may comprise oil, and forming the TPV may include adding process oil prior to and/or with the curative, but exclude adding process oil after the curative (e.g., making TPVs according to such embodiments may include only the "preloaded" process oil per previous discussion). Or, similarly, a smaller amount of process oil may be added after the curative. This post-cure process oil can instead be included with the foaming agent masterbatch, such that the oil is added to the foamed TPV composition through the foaming agent masterbatch (rather than during the post-cure portion of formation of the pre-foamed TPV composition).

Also or instead, the foaming agent masterbatch may include additives, such as clay and/or carbon black. Conveniently, some portion of the clay and/or carbon black desired to be present in the resulting foamed TPV composition originates from the foaming agent masterbatch instead of the TPV composition. That is, for a desired amount of clay (e.g., 40 phr) in a foamed TPV composition, instead of including 40 phr clay in the pre-foamed TPV composition, one could make the pre-foamed TPV composition with 40-n phr of clay, and further include clay in the foaming agent masterbatch so that n phr of clay is present in the foaming agent masterbatch mixed with the pre-foamed TPV composition to form the foamed TPV composition. In this way, the resulting foamed composition still contains 40 phr clay, but some portion originated from the masterbatch. This distribution of components could be applied to any other additive (e.g., carbon black) so as to obtain TPV composition and foaming agent masterbatch of desirably similar specific gravity.

Applications

Foamed TPV compositions in accordance with various embodiments may be suitable for forming any number of articles. Some non-limiting examples include automotive and industrial components such as weatherseals, glass run channels (all or any portion thereof, such as foot or base portions of such glass run channels), automotive boots and bellows (e.g., for steering and suspension), tubing, seals, gaskets, splines, air induction system ducts, consumer electronics (e.g., cabling or coating for wires), grips, and the like. Such compositions may be particularly suitable for applications in which low weight molded elastomeric polymer components are desired.

EXAMPLES

In order to provide a better understanding of the foregoing discussion, the following non-limiting examples are offered. Although the examples may be directed to specific embodiments, they are not to be viewed as limiting the invention in any specific respect.

Materials Used in Examples

"V3666" was Vistalon™ 3666 EPDM rubber which is an ethylene-propylene-diene rubber that has 64.0 wt % ethylene content (ASTM D3900) and 4.5 wt % ENB diene content (ASTM D6047). V3666 is oil extended with 75 phr of oil and has an oil-extended Mooney Viscosity of 52 MU (ML 1+4, 125° C.; ASTM D1646). V3666 is commercially available from ExxonMobil Chemical Company, Houston, Tex.

"VM3020" was Vistamaxx™ 3020 propylene-based elastomer which is a random propylene-ethylene copolymer with an ethylene content of 11 wt %. VM3020 has a density of 0.874 g/cc (ASTM D1505), a melt index of 1.1 g/10 min (ASTM D1238; 190° C. and 2.16 kg weight), a MFR of 3 g/10 min (ASTM D1238; 230° C. and 2.16 kg weight), a Shore D hardness of 34 (ASTM D2240), and a Vicat softening temperature of 68.3° C. VM3020 is commercially available from ExxonMobil Chemical Company, Houston, Tex.

"PP5341" was ExxonMobil™ PP5341 polypropylene which is a polypropylene homopolymer with a density of 0.9 g/cc and a MFR of 0.83 g/10 min (ASTM D1238; 230° C. and 2.16 kg weight). PP5341 is commercially available from ExxonMobil Chemical Company, Houston, Tex.

"Clay" was Icecap™ K Clay.

"Zinc Oxide" or "ZnO" was Kadox 911.

"SnCl$_2$ MB" was an anhydrous stannous chloride polypropylene masterbatch. The SnCl$_2$ MB contained 45 wt % stannous chloride and 55 wt % of polypropylene having an MFR of 0.8 g/10 min (ASTM D1238; 230° C. and 2.16 kg weight).

"Black MB" was a carbon black masterbatch that contained 57.75 wt % polypropylene having an MFR of 35 g/10 min (ASTM D1238; 230° C. and 2.16 kg weight), 41.1 wt % carbon black, 1 wt % Kenamide S, and 0.25 wt % primary antioxidant.

"RIO" was a phenolic resin-in-oil curative that contained 30 wt % phenolic resin and 70 wt % oil.

"Oil" was Sunpar 150M paraffinic oil available from HollyFrontier Refining & Marketing LLC.

Example 1

Figure 1:
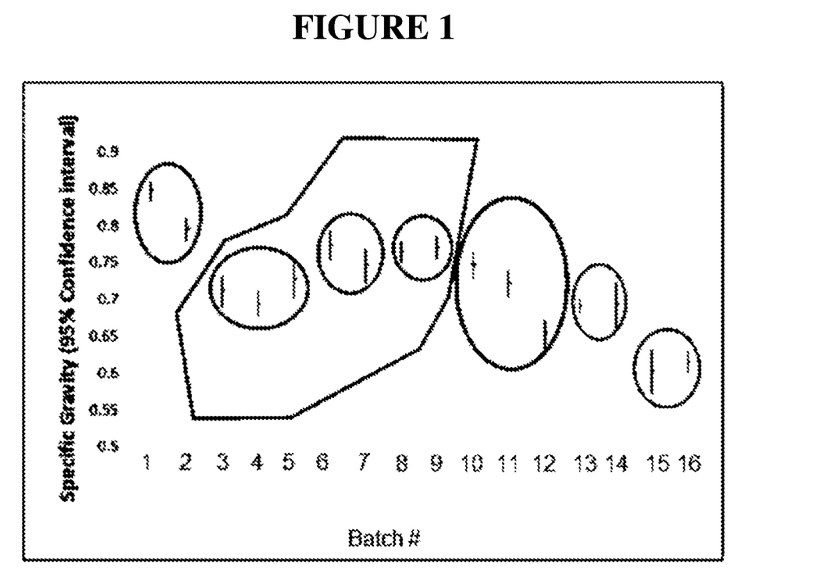
FIG. 1 is a graph showing specific gravity values for foamed TPVs formed using various process conditions and various amounts of foaming agent masterbatch in connection with Example 1.

To demonstrate the variability in extent of foaming due to low concentrations of highly-loaded foaming agent masterbatch, a commercial TPV (Santoprene™ TPV grade 101-87, available from ExxonMobil Chemical Company) was foamed by coextrusion. Different batches of the TPV were foamed using different extruder conditions and/or different amounts of foaming agent masterbatch (EXPANCEL™ 951MB120, a masterbatch containing 65 wt % thermo-expandable microspheres in ethylene vinyl-acetate (EVA) carrier polymer, available from Akzo-Nobel). For each batch, multiple samples (10 to 15) were foamed to give multiple data points for each batch. FIG. 1 illustrates the specific gravity measured for each batch of foamed TPV samples (each batch being a discrete label on the x-axis). In FIG. 1, each batch is plotted as a bar indicating 95% confidence interval for all measured samples in the batch.

Further, the shading in FIG. 1 encompassing multiple batches represents different batches that were each foamed at the same conditions (i.e., same extruder temperature profile, RPM, and other parameters, and same wt % of chemical foaming agent). Thus, within each shaded region, one would expect the different batches to nonetheless have identical or near-identical specific gravity. However, as can be seen in FIG. 1, even within the shaded areas, measured specific gravity different substantially (with the effect even more pronounced with smaller amounts of foaming agent masterbatch, e.g., 0.5 wt % blended with 99.5 wt % TPV).

Example 2

Pellets of (i) Santoprene™ 101-87 TPV and (ii) EXCPANCEL™ 951MB120 foaming agent masterbatch were blended together in a pellet blender, and then the flow of the blended pellets was simulated through a typical feed hopper for feeding polymer pellets to an extruder for coextrusion and foaming. The pellets were collected as they exited the hopper. Periodically, the feed was halted, the cumulative mass of pellets collected was recorded, and the foaming agent pellets (white) were counted, as were the TPV pellets (black). From this count, the recorded cumulative mass, and the known wt % of foaming agent in the 951MB120 masterbatch (65 wt %), an approximate wt % of foaming agent among the collected pellets was calculated.

Figure 2:
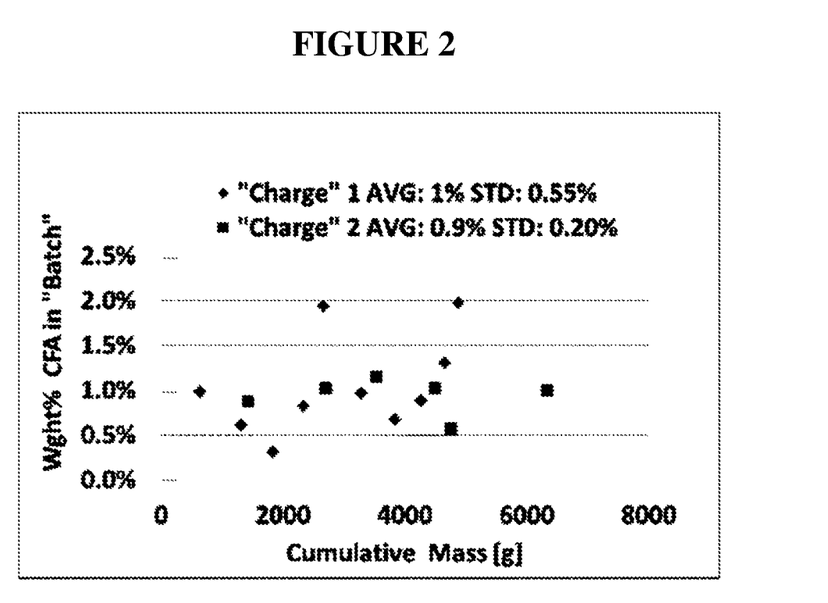
FIG. 2 is a graph showing average weight % of foaming agent masterbatch in pellet batches of TPV pellets and masterbatch pellets in connection with Example 2.

FIG. 2 is a graph plotting wt % of foaming agent in the pellet batch as a function of cumulative mass of the pellet batch collected over time, for two different runs (Charge 1 and Charge 2, as labeled in FIG. 2). Over the course of Charge 1, an average of 1 wt % foaming agent masterbatch pellets were mixed with 99 wt % TPV pellets; over the course of Charge 2, an average of 0.9 wt % foaming agent masterbatch pellets were mixed with 99.1 wt % TPV pellets.

As shown in FIG. 2, the wt % of foaming agent varied substantially with respect to cumulative mass collected (i.e., with respect to time), indicating that foaming agent delivered to an extruder for foaming will vary over time, and thus the extruded foamed TPV article will have differing specific gravity along the length of the article (i.e., as the continuous extrusion progresses).

All documents described herein are incorporated by reference herein. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A method comprising:
   (a) combining 80 to 97 wt % of a thermoplastic vulcanizate (TPV) composition with 3 to 20 wt % of a foaming agent masterbatch;
      wherein the TPV composition comprises (i) an at least partially vulcanized rubber component dispersed in a thermoplastic component comprising a thermoplastic resin and, optionally, a first portion of a plastomer and/or a first portion of a propylene-based elastomer; (ii) oil; and (iii) optionally, one or more additives;
      further wherein the foaming agent masterbatch comprises thermo-expandable microspheres in a carrier polymer comprising a second portion of the plastomer and/or a second portion of the propylene-based elastomer; and
   (b) forming therefrom a foamed TPV composition comprising (i) the at least partially vulcanized rubber component dispersed in the thermoplastic component comprising the thermoplastic resin and one or more of the plastomer and the propylene-based elastomer; (ii) the oil; and (iii) the optional one or more additives;
      wherein the first portion of each of the plastomer and/or the propylene-based elastomer is within the range from 0 to 75 wt % of the total amount of the plastomer and/or propylene-based elastomer, respectively, in the foamed TPV composition;
      further wherein the second portion of each of the plastomer and/or the propylene-based elastomer forms the balance of the total amount of each of the plastomer and/or the propylene-based elastomer in the foamed TPV composition; and
      further wherein the thermo-expandable microspheres have initiation temperature of at least 130° C., and further wherein all of the carrier polymer is capable of being melt processed at temperatures less than the initiation temperature.

2. The method of claim 1, wherein all of the carrier polymer is capable of being melt processed at temperatures of 110° C. or less.

3. The method of claim 1, wherein the plastomer, if present, comprises a copolymer of ethylene and one or more $C_3$ to $C_{10}$ α-olefins, has a density less than 0.915 g/cm³, melt index (ASTM D-1238 at 190° C., 2.16 kg load) between 0.10 and 20 dg/min, and has a melting point $T_m$ less than 110° C.

4. The method of claim 1, wherein the carrier polymer comprises the second portion of the propylene-based elastomer, and further wherein the thermoplastic component of the TPV composition optionally comprises the first portion of the propylene-based elastomer such that the first portion of the propylene-based elastomer is within the range from 0 to 75 wt % of the total amount of the propylene-based elastomer in the foamed TPV composition.

5. The method of claim 4, wherein each of (1) the thermoplastic component of the TPV composition, (2) the carrier polymer, and (3) the foamed TPV composition contains no plastomer.

6. The method of claim 4, wherein the first portion of the propylene-based elastomer is within the range from 0 to 20 wt % of the total amount of the propylene-based elastomer in the foamed TPV composition, with the second portion of the propylene-based elastomer forming the balance of the total amount of the propylene-based elastomer in the foamed TPV composition.

7. The method of claim 4, wherein the TPV composition comprises no propylene-based elastomer, and further wherein all of the propylene-based elastomer of the foamed TPV composition originates from the carrier polymer of the foaming agent masterbatch.

8. The method of claim 4, wherein the carrier polymer consists of the propylene-based elastomer.

9. The method of claim 1, wherein the propylene-based elastomer, if present, has at least 60 wt % units derived from propylene and the balance derived from ethylene and/or one or more $C_4$ to $C_{10}$ comonomers;
   and further wherein the propylene-based elastomer has the following properties: (i) melt flow rate (MFR) of 1 to 5 g/10 min (ASTM D-1238, 230° C. and 2.16 kg), (ii) melting point ($T_m$) of 105° C. or less, and (iii) heat of fusion ($H_f$) within the range from 1 to 80 J/g.

10. The method of claim 1, wherein the foaming agent masterbatch comprises 5 to 30 wt % of the thermo-expandable microspheres in 70 to 95 wt % of the carrier polymer.

11. The method of claim 1, wherein the method comprises combining 88 to 95 wt % of the TPV composition with 5 to 12 wt % of the foaming agent masterbatch.

12. The method of claim 1, wherein the foaming agent masterbatch comprises 7 to 25 wt % thermo-expandable microspheres in 75 to 93 wt % carrier polymer.

13. The method of claim 1, wherein the rubber component comprises ethylene-propylene-diene (EPDM) terpolymer, and the thermoplastic resin comprises homopolypropylene.

14. The method of claim 1, wherein the thermoplastic resin is polypropylene having MFR within the range from 0.1 to 5 g/10 min (ASTM D-1238, 230° C. and 2.16 kg).

15. A foamed TPV composition made by the method of claim 1.

16. An article made from the foamed TPV composition of claim 15.

* * * * *